H. C. SEIPP.
HEATER.
APPLICATION FILED JULY 28, 1917.
1,279,455.
Patented Sept. 17, 1918.
2 SHEETS—SHEET 1.
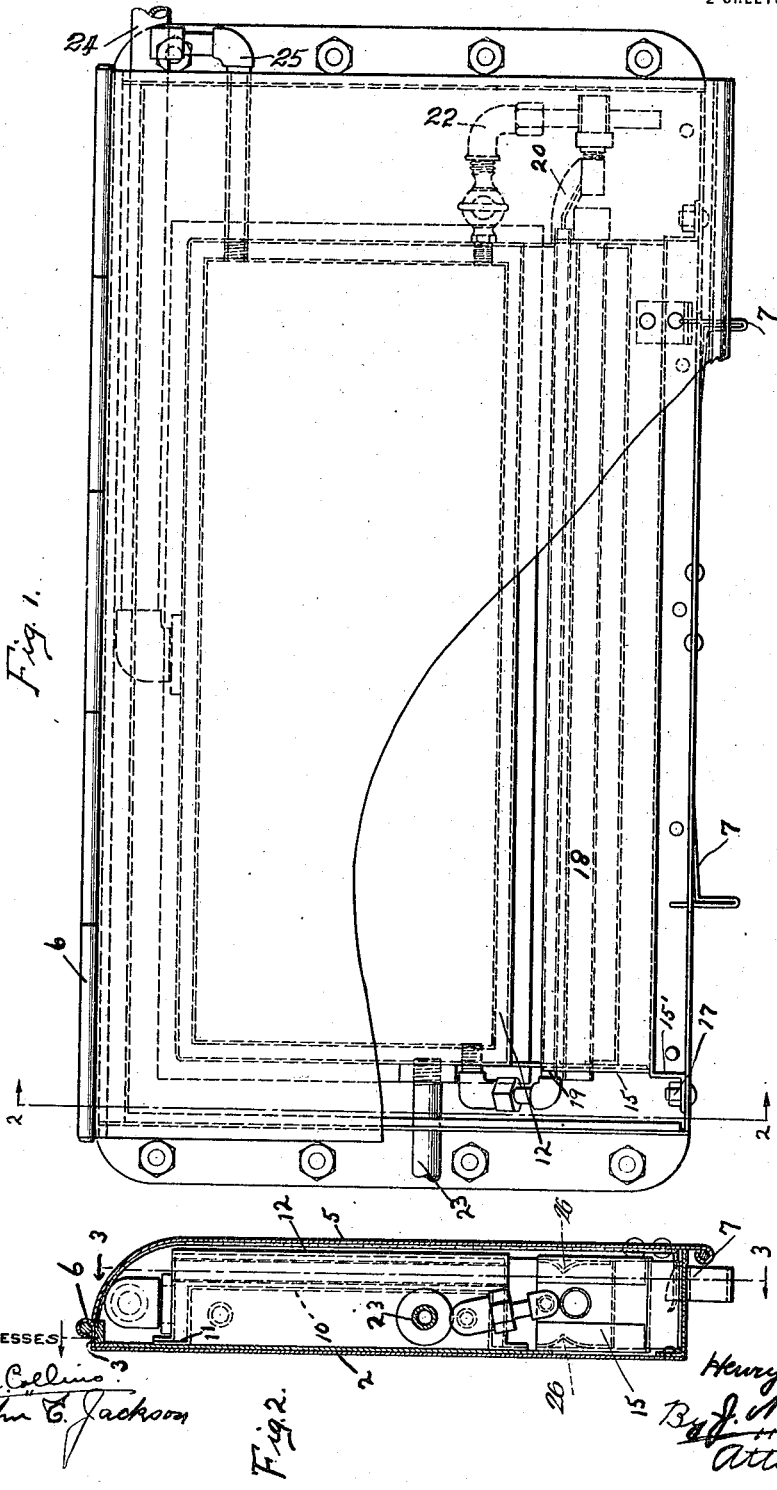

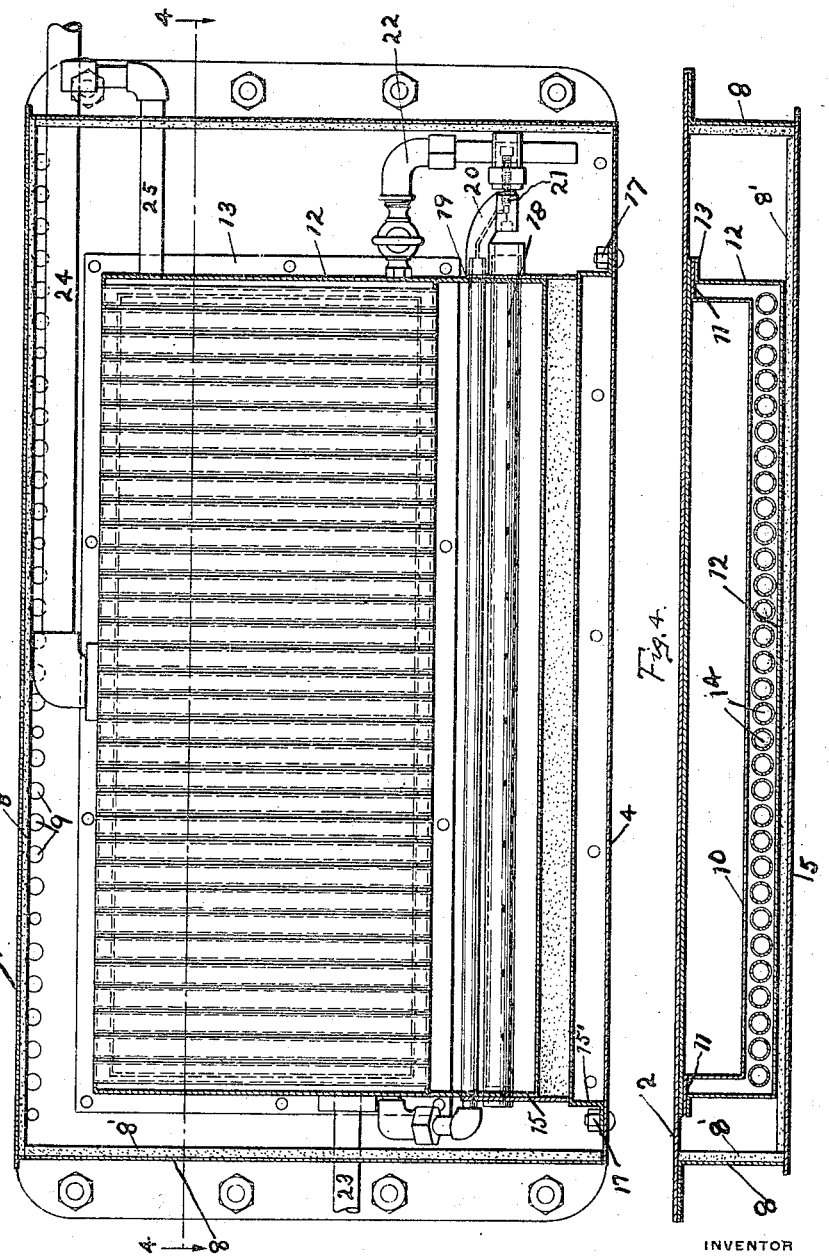

UNITED STATES PATENT OFFICE.

HENRY C. SEIPP, OF PITTSBURGH, PENNSYLVANIA.

HEATER.

1,279,455.  Specification of Letters Patent.  Patented Sept. 17, 1918.

Application filed July 28, 1917.  Serial No. 183,244.

*To all whom it may concern:*

Be it known that I, HENRY C. SEIPP, a citizen of the United States, and a resident of Pittsburgh, in the county of Allegheny and State of Pennsylvania, have invented a new and useful Improvement in Heaters; and I do hereby declare the following to be a full, clear, and exact description thereof.

My invention relates to improvements in heaters, and has special reference to heaters using water for distributing the heat, and is more particularly adapted for use in heating the water in a radiator and water jacket of an automobile engine.

The object of my invention is to provide a cheap and efficient form of heater, which can be attached to and carried by an automobile, or if used for other purposes may be transported or carried from place to place.

It is a special object of my invention, however, to provide a heater that may be attached to and carried by an automobile, such heater being adapted to heat and circulate the water within the radiator and water jacket of the engine of an automobile in such manner as to keep the engine at a normal or warm temperature when the temperature of the atmosphere is such as to normally freeze or chill the engine.

Although I have illustrated and described my invention as being particularly adapted for use in the heating of automobiles, it will be readily understood that the same or a similar construction may be employed for other heating purposes, as for instance, a room of a house, by substituting a radiator of any known type instead of an automobile water circulating system. It will, therefore, be understood that I do not wish to be limited to my specific construction shown and described, but that many changes in design and construction may readily be made without departing from the spirit of my invention, as defined in the appended claims.

To enable others skilled in the art to which my invention appertains to construct and use my improved heater, I have illustrated in the accompanying drawings one preferred form of the same.

In the drawings:

Figure 1 is a side elevation of my improved heater, with the cover partly broken away;

Fig. 2 is a vertical cross section of the heater on the line 2—2 Fig. 1 and looking in the direction of the arrow; and Fig. 3 is a longitudinal section of the heater on the line 3—3 Fig. 2, looking in the direction of the arrow, and Fig. 4 is a view on the line 4—4 of Fig. 3.

My heater is adapted for convenience to be secured to the lower part of the ordinary form of automobile radiator, and is preferably formed of sheet metal, such as steel or aluminum, and comprises a casing composed of a back plate 2 bent forward adjacent its top to form an integral top wall 3. The bottom wall 4 is formed of a separate piece of metal having its rear edge bent at right angles to form a securing flange, and is secured in any desired manner to the plate 2.

The front portion or closure of the heater casing comprises a hinged door or wall 5,— hingedly secured at 6 to the top portion 3, and secured at its lower edge are spring catches 7. The end portion of my heater casing comprises rectangular members 8 having their one edge bent at right angles to form securing flanges and secured to the plate 2 by riveting, or in any other desired manner.

The entire inner surface of the heater casing is covered by asbestos 8', or by other suitable heat insulating substances, to prevent the escape of the heat to the open atmosphere.

The back plate 2 has suitable perforations 9 adjacent its top to permit the escape of heat and allow a draft for combustion purposes, and to direct the heated air into the honey-comb portion of the radiator so that it may be utilized in heating the engine of the automobile.

Within the casing of my heater is secured a rectangular pan-shaped tank-portion 10 having an outwardly flaring flange 11 around its edge adapted to be secured to the back plate 2 of the casing. A second rectangular pan-shaped tank or shell 12, of greater dimensions than the tank 10, and adapted to extend over and completely around and be spaced from the tank 10 to provide a water jacket, is secured to the flange 11 by a flange 13 on the rear edge of said shell 12.

Extending through the tank or shell 12 are a plurality of radiating tubes or flues 14, spaced equally distant longitudinally thereof.

Spaced from and secured to the bottom of the casing is a rectangular pan-shaped member 15 having leg members 15'. The member 15 is adapted to be partially filled by heat insulating material, such as asbestos, and to be detachably secured to the bottom 4 of the casing by bolts 17 or other suitable means. Between the member 15 and the shell or tank 12 I provide a burner 18 secured in one of the end walls of the casing. A fuel conveying pipe or conduit 19 extends above the burner 18 and on a plane therewith, and has its one end extending upwardly to communicate with the tank 10. The other end is secured in a fuel mixer 20 of well known construction, which has a needle valve control 21. An outlet or drain cock 22 is secured in the lower portion of the tank 10 for the purpose of draining fuel therefrom when necessary. The space between the tank 10 and the tank or shell 12 is adapted to contain water and have a continuous flow of the same through an inlet pipe 23 secured in one end of the tank or shell 12, and a continuous outlet to any desired point is taken from the upper portion of the space formed between the tank 10 and shell 12, said outlet being through a pipe 24. The tank 10 is adapted to contain a suitable supply of fuel, which is adapted to be poured or fed in any desired manner into the tank through a suitable inlet 25. The burner 18 is surrounded by a shield 26 adapted to direct the flame and heat downwardly. The burner may be lighted if desired by a match or other light by opening the door 5, but it is evident that it can be lighted in any desired manner, such as by an electric burner or sparker secured within the member 15 and in close proximity to the burner 18.

The construction and operation of my device can be readily understood from the foregoing description, but below is described in detail the operation, in order that it may be clearly understood.

The tank 10 can be filled with petroleum product, such as gasolene or kerosene, and the space between the tank 10 and the tank or shell 12 is filled with water, such as from the water cooling system. The water in the cooling system becoming heated by the running of the engine, will circulate around and through the heater and cause the generation of gas within the tank 10, thus permitting the ignition of the burner at any desired time. When the burner has become ignited, it will further heat the fuel as it passes through the pipe 19 to the mixer 20, and thus cause a higher grade of gas and more effective combustion.

The burner 18 will heat the water in the space between the tanks 10 and 12 and thereby cause it to circulate through the water cooling system, and thus provide a means for keeping the automobile engine at a continuous even heat.

It will be readily understood that, although as before stated, I have described my invention in connection with an automobile system, it may be readily applied to other heating systems, as for instance in connection with the commercial radiator used to heat a room in a residence or to heat any other place desired.

Having thus described my invention, what I claim is:

1. A device of the class described comprising a casing, a fuel tank therein, a water jacket inclosing said fuel tank, means for heating the water within said water jacket, said means comprising a burner, and means for conveying fuel from said tank to said burner.

2. A heater comprising a casing, a fuel tank therein, a water jacket inclosing said fuel tank, a burner secured in said casing, means for conveying fuel from said fuel tank to said burner, and means for permitting circulation of the water through said water jacket.

3. A heater comprising a casing, a fuel tank therein, a hot water jacket surrounding said fuel tank, a burner secured in said casing below said water jacket, and a pipe for conveying fuel from said fuel tank to said burner, said pipe passing over said burner to provide for pre-heating of the fuel.

4. A heater comprising a casing, a fuel tank therein, a hot water jacket inclosing said fuel tank, a burner for heating the water in said water jacket, and means for permitting circulation of the water through said jacket.

5. A heater of the class described comprising a casing, a fuel tank therein, a water jacket inclosing said fuel tank, a plurality of radiating tubes within said water jacket, a burner secured in said casing, means for conveying fuel from said tank to said burner, and means for providing for circulation of the water in said jacket.

6. A heater of the class described comprising a casing, a fuel tank therein, a water jacket inclosing said fuel tank, a plurality of radiating tubes extending through said water jacket, said tubes having open ends, a burner secured in said casing, means for conveying fuel from said fuel tank to said burner, and means for permitting circulation of the water in said jacket.

7. A heater comprising a casing, a rectangular water tank therein, a rectangular fuel tank, of less dimensions than said water tank, disposed within said water tank, a burner for heating the water in said first named tank, and means for conveying fuel from said fuel tank to said burner.

8. A heater comprising a casing, a water tank within said casing, a fuel tank disposed within said water tank, a burner disposed below said water tank, and means for conveying fuel from said second named tank to said burner.

9. A heater comprising a casing, a water tank within said casing, a fuel tank disposed within said water tank, a burner disposed below said water tank, and a pipe for conveying fuel from said fuel tank to said burner, said pipe passing over said burner to provide for reheating of the fuel.

10. A heater comprising a casing, a rectangular water tank secured to the back wall of said casing, a rectangular fuel tank of less dimensions than said water tank disposed within the same and secured to the back wall of said casing, a plurality of radiating flues extending upwardly through said first named tank, a burner disposed within said casing and below said first named tank, and means for conveying fuel from said fuel tank to said burner.

11. A heater comprising a casing, a rectangular water tank secured to the back wall of said casing, a rectangular fuel tank of less dimensions than said water tank disposed within the same and secured to the back wall of said casing, a plurality of radiating flues extending upwardly through said first named tank, a burner disposed within said casing and below said first named tank, and a pipe for conveying fuel from said fuel tank to said burner, said pipe passing between said first named tank and said burner to provide for pre-heating of the fuel.

In testimony whereof, I the said HENRY C. SEIPP, have hereunto set my hand.

HENRY C. SEIPP.

Witnesses:
J. M. GEOGHEGAN,
J. C. JACKSON.

Copies of this patent may be obtained for five cents each, by addressing the "Commissioner of Patents, Washington, D. C."